(No Model.) 2 Sheets—Sheet 1.

G. BAUMANN.
PRESS.

No. 579,336. Patented Mar. 23, 1897.

WITNESSES:
C. Neveux
C. R. Ferguson

INVENTOR
G. Baumann.
BY
[signature]
ATTORNEYS.

THE NORRIS PETERS CO., PHOTO-LITHO., WASHINGTON, D.C.

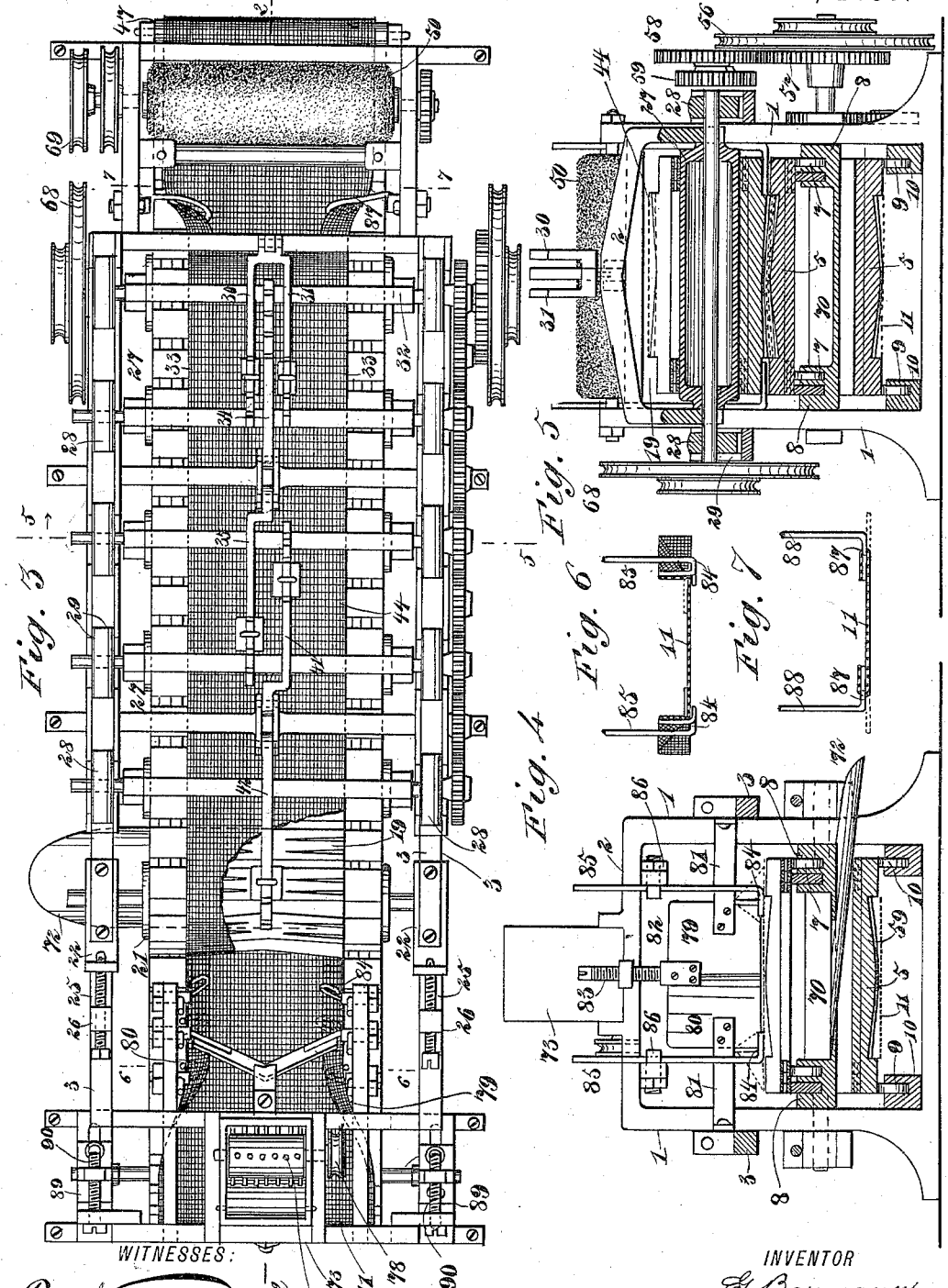

UNITED STATES PATENT OFFICE.

GERHARD BAUMANN, OF MONMOUTH JUNCTION, NEW JERSEY.

PRESS.

SPECIFICATION forming part of Letters Patent No. 579,336, dated March 23, 1897.

Application filed May 15, 1896. Serial No. 591,632. (No model.)

*To all whom it may concern:*

Be it known that I, GERHARD BAUMANN, of Monmouth Junction, in the county of Middlesex and State of New Jersey, have invented new and useful Improvements in Presses, of which the following is a full, clear, and exact description.

This invention relates to presses for extracting the juice from fruit, such, for instance, as cider-presses; and the object is to provide a machine in which the whole apples may be supplied through a hopper and formed into pomace, the said pomace being carried forward between horizontally-arranged extractors.

The invention comprises endless bands arranged to travel in a substantially horizontal position, and between which the pomace is pressed to extract the juice or cider.

The invention further consists in the combination and novel construction of the parts, as will be hereinafter specified, and particularly pointed out in the appended claims.

Reference is to be had to the accompanying drawings, forming a part of this specification, in which similar characters of reference indicate corresponding parts in all the views.

Figure 1:
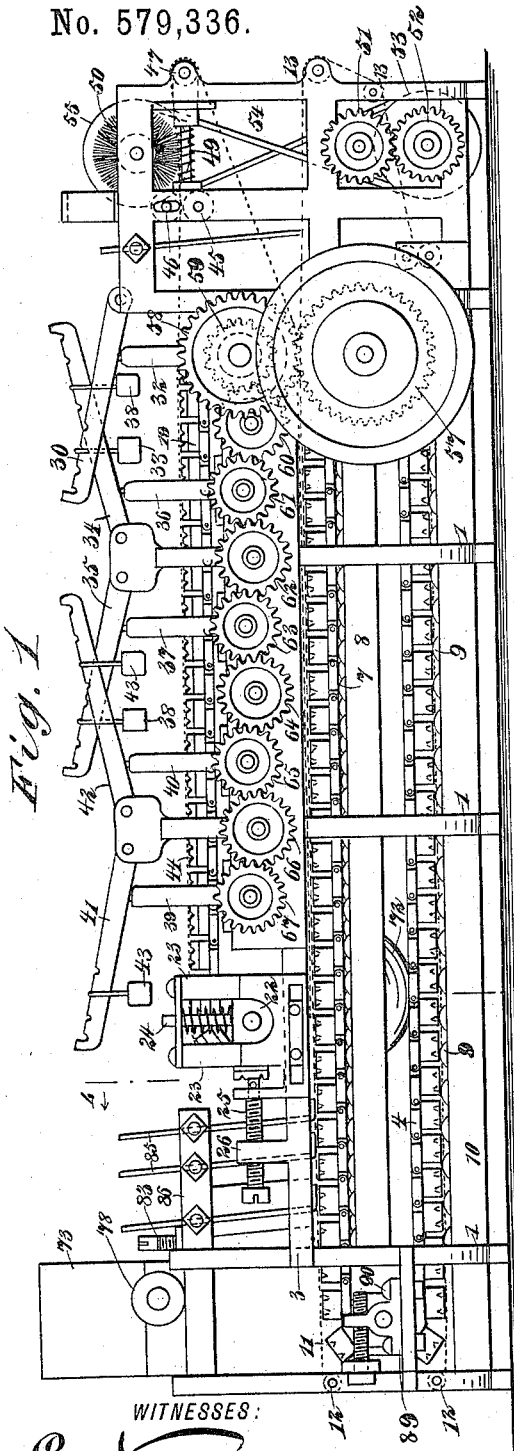
Figure 2:
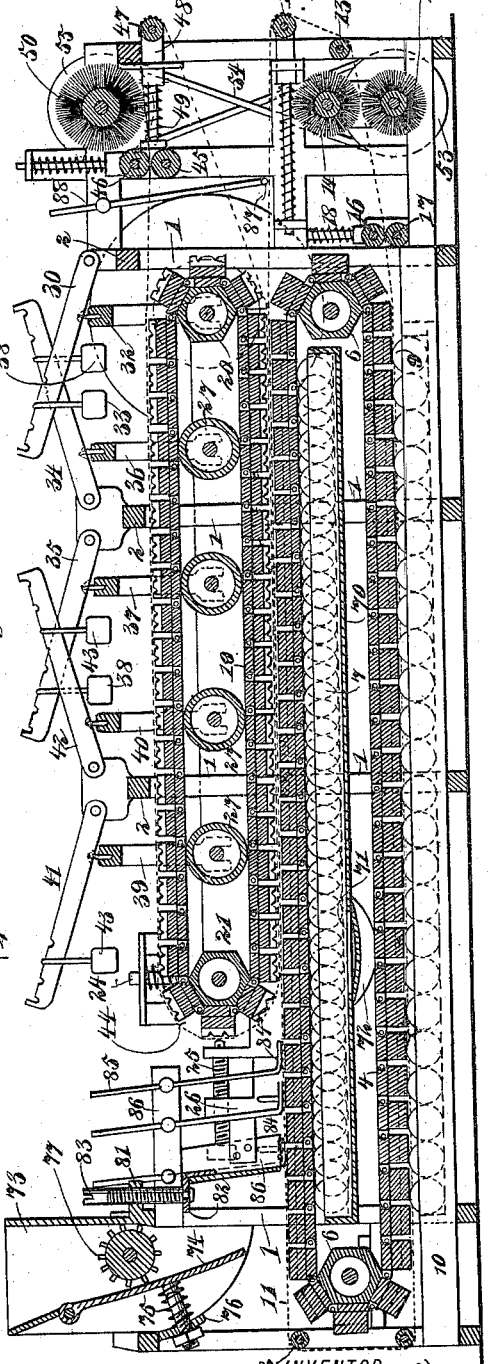

Figure 1 is a side elevation of a press embodying my invention. Fig. 2 is a longitudinal section thereof on the line 2 2 of Fig. 3. Fig. 3 is a top plan view. Fig. 4 is a transverse section on the line 4 4 of Fig. 1. Fig. 5 is a transverse section on the line 5 5 of Fig. 3. Fig. 6 is a section through the line 6 6 of Fig. 3, and Fig. 7 is a section through the line 7 7 of Fig. 3.

The frame comprises a series of uprights 1, connected together at the top by cross-pieces 2, and to these uprights 1 longitudinally-extended side pieces 3 are attached. Arranged lengthwise in the lower portion of the frame is a carrier 4, consisting of transverse metal bars 5, hinged one to another at their inner edges and extended around rollers 6, polygonal in cross-section and having journal-bearings in the frame of the machine. The several bars 5 are here shown as convexed between their ends, and the top series of bars 5 are designed when the carrier is in motion to ride upon antifriction-rollers 7, arranged in pairs at each end of the bars, the said pairs being seated loosely in longitudinal channels formed in bars 8, secured to the inner sides of the uprights 1, and the lower stretch of this carrier is designed to bear upon antifriction-rollers 9, seated in channels or grooves formed in string-pieces 10.

It will be seen that the rollers 7 of one row in a pair overlap the rollers of the other pair, so that a very firm and practically continuous foundation is formed for the carrier, this being necessary, as considerable pressure will be brought to bear upon said carrier, as will be hereinafter described. This carrier 4 extends nearly the entire length of the frame and has mounted to move with it an endless belt 11, of suitable material, such, for instance, as canvas or webbing. As here shown this belt 11 at the front end of the machine passes over rollers 12, journaled in the front uprights of the frame, and also over rollers 13, journaled at the rear end of the machine. After passing over the rollers 13 the belt 11 passes between cleaning-brushes 14 15, both journaled in the rear portion of the frame, and thence between the rollers 16 17, journaled in the frame adjacent to the rear end of the carrier 4. The upper roller 16 of this pair is journaled in boxings adapted to move vertically under yielding pressure. As here shown the boxings have rods 18 extended upward and loosely through suitable openings in a portion of the frame, and coiled springs surround the rods between said frame portion and the boxings.

Arranged above the carrier 4 and adapted to engage therewith is an endless presser 19, consisting of transverse bars linked together in a manner similar to the transverse bars of the carrier, and the bars of this presser are concaved between their ends. This presser at one end passes around a roller 20, polygonal in cross-section and having fixed journal-bearings at one end of the frame, and also around a roller 21, also polygonal in cross-section and having journal-bearings adjustable longitudinally of the frame and also having a slight vertical yielding motion. As here shown, the journal-bearings for this roller 21 comprise boxes 22, movable between uprights 23, mounted to slide longitudinally of the bars 3. Pins 24 extend upward in the boxes through top plates on the posts 23, and springs are arranged between this top plate and the boxes.

As a means to adjust the roller 21 longitudinally of the machine I employ screws 25, having screw-thread engagement with lugs 26, extended upward from the side bars 3, and the ends of these screws 25 have a swivel engagement with a portion of the uprights or posts 23. Obviously, by manipulating these screws 25 the presser 19 may be more or less tightened.

Within the presser 19, between the rollers 20 21, are pressure-rollers 27. These pressure-rollers are designed to bear with a slight yielding pressure upon the lower stretch of the presser. To accomplish this, the journals of the rollers are extended into boxings 28, adapted to slide vertically in suitable guideways 29, supported on the bars 3.

It may be here stated that the roller 20 has its journal-bearings in similar boxings, so that it may move vertically.

To the transverse bar 2 at the rear end of the machine is pivotally connected a lever consisting of two arms 30 31, which extend forward and engage loosely with the transverse or top bar of a yoke 32, which has its downwardly-extended ends slotted to engage over the journals of the roller 20, and adjustably mounted on the free ends of the arms 30 31 are weights 33.

To the cross-bar 2 of the next standard 1 levers 34 35 are pivoted. One lever, 34, extends rearward between the arms 30 31 and engages a yoke 36, engaging loosely with the journals of its bearing-roller in the manner first described. The lever 35 extends in the opposite direction, or toward the front of the machine, and engages with a yoke 37, bearing upon the journal-bearings of the presser-roller, and these levers 34 35 have weights 38 adjustably mounted on them.

The first and second bearing-rollers 27 of the series have their respective journals engaged by removable yokes 39 40, which are engaged by levers 41 42, fulcrumed on the cross-bar of the first upright 1, and on these levers 41 42 weights 43 are adjustably mounted. To prevent a possible lateral movement relatively between the yokes and the levers, the yokes may be provided with pins which engage in sockets formed in the under sides of the levers, as plainly indicated in Fig. 2.

Engaging closely around the presser 19 is a band 44 of textile or similar material, and it will be seen that the endless presser 19 is somewhat shorter than the carrier 4, the carrier being extended beyond the presser at the front portion of the machine. At the rear end of the machine the band 44 extends between rollers 45 46, journaled in the frame, and the upper one of said rollers being adapted to move vertically under yielding pressure. From the rollers 45 46 the belt or band 44 extends around a roller 47, having journal-bearings in boxes 48, mounted to move longitudinally of the frame and under pressure of springs 49 on the horizontally-extended shank portions of the boxes. The upper side of the band or belt 44 between the roller 47 and the rollers 45 46 is engaged by a rotary cleaning-brush 50.

The journals of the brushes 14 15 are geared together at one end by pinions 51 52, and the opposite end journal of the brush 15 is provided with a band-wheel 53, from which a band 54 extends to a band-wheel 55 on the journal of the brush 50. This band is here shown as crossed, so that the brush 50 will rotate in a direction opposite to that of the brush 15.

One journal of the carrier-roller 6 is provided with a power-wheel or band-wheel 56, and also with a gear-wheel 57, meshing with a gear-wheel 58, which is secured to the extended journal of the roller 20, and the several rollers 27 are rotated by means of a pinion 59 on the journal-bearing having the gear-wheel 58. This pinion 59 engages with an idler-pinion 60, which in turn engages with a pinion 61 on the shaft of the adjacent pressure-roller 27. This pinion 61 engages with an idler-pinion 62, which engages with a pinion 63 on the journal of the next pressure-roller. This pinion 63 engages with an idler-pinion 64, which engages with a pinion 65 on the shaft of the next pressure-roller 27, and this pinion 65 engages with an idler-pinion 66, which in turn engages with a pinion 67 on the journal of the next presser-roller, which in this instance is the first presser-roller of the series.

On the journal of the roller 20 opposite that bearing the gear-wheel 58 is a band-pulley 68, adapted to have a band engagement with a pulley 69 on the journal of the rotary brush 15. It will be seen by this construction that when the power-wheel 56 is rotated by any desired power motion will be imparted to the several brushes and to the endless carrier and endless presser.

Arranged within the carrier 4 and adapted to receive juice or cider forced through the same is a pan 70, the sides of which are here shown as formed by the grooved bars 8. This pan has an opening 71 through its bottom, communicating with a spout 72, leading outward from the machine and through which the cider is designed to flow to a suitable receptacle.

A hopper 73 is arranged at the forward end of the frame of the machine and opens downward onto the belt of the carrier 4. One wall 74 of this hopper is hinged at its upper end so as to swing with yielding pressure, and is here shown as having a finger 75 extended outward loosely through an opening in a cross-bar 76 of the hopper, and between this movable wall and the cross-bar 76 is arranged a spiral spring adapted to hold said wall yieldingly toward a cylindrical cutter 77, having journal-bearings in the hopper 73, and on a journal of this cutter 77 is secured a band-wheel 78, through which rotary motion is imparted to the cutter.

In operation the whole apples will be placed in the hopper 73 and of course will be reduced to pomace by the cutter. This pomace will fall onto the belt 11. Before it is carried forward, however, or through the pressing operation, it is desired to spread the pomace in a sheet of substantially uniform thickness across the belt. As a means therefor I employ a spreader comprising plates 79 80, which extend outward in opposite directions and slightly forward to an engagement with arms 81, extended from the side rails or bars 3. The central or apex portion of this spreader has a lug 82 extended toward the hopper 73, and this lug 82 is in swivel connection with an adjusting-screw 83, extended upward through a tapped opening in a lug projected from the hopper. By means of this screw 83 the spreader may be adjusted vertically with relation to the band 11. After spreading the pomace on the band and before it reaches the endless presser it is desired to turn in the edges of the band 11, so that pomace cannot be forced out laterally. For this purpose I employ a series of fingers 84, arranged at opposite sides of the band and alternately engaging the upper and lower sides of said band. These fingers 84 are extended horizontally, or substantially so, from rods 85, depending from arms 86, extended from the hopper. In order to unfold or again spread out the band 11 after the pressing operation, I employ horizontally-disposed fingers 87, which are suitably curved to engage underneath the folded portion of the belt and are attached to rods or arms 88, depending from side members of the machine-frame.

The several transverse bars of the carrier 4 and of the presser 19 are longitudinally grooved on their outer sides, and these grooves form channels or receptacles for the flow of juice or cider prior to its discharge through the carrier to the pan 70. Without these grooves the pressure would force a portion of the juice over the ends of the carrier-links.

In order to adjust the tension of the carrier 4, I may mount the journals of its front end roller 6 in carriages 89, adapted to be moved longitudinally of the machine-frame. As here shown, these carriages 89 are engaged by screw-rods 90, which pass through lugs extended laterally from the frame.

In operation as the apples are fed to the hopper they will be ground to pomace therein, and this pomace falling upon the band 11 will be spread or distributed by the spreader, and as the carrier moves along its opposite edges will be turned over, carrying the sheet of pomace with it, and as this pomace is carried beneath the presser the juice or cider will be forced out, and of course the pressure may be regulated by the weights on the several levers of the presser-rollers. After passing through the endless presser the belt 11 will be straightened out by the fingers 87, and the pomace will be carried over the end of the machine and deposited in a suitable receptacle. The meshes of the carrier 11 may be cleaned from particles of pomace that may adhere thereto by means of the brushes 14 15, and the band 44 may be similarly cleaned by means of the brush 50. The pressed-out juice or cider of course will run into the pan 70, from which it will discharge through the spout 72.

Having thus described my invention, I claim as new and desire to secure by Letters Patent—

1. A press, comprising a substantially horizontally-movable endless carrier supported on two carrying-rollers on which the carrier is stretched and one of said rollers being vertically yielding and adjustable, vertically-movable rollers inclosed in the presser for bearing the same down upon the carrier, yokes having their two downwardly-extending arms engaging the bearings of the presser-rollers, and weighted levers bearing down upon the horizontal cross-bars of said yokes, all substantially as set forth.

2. A press having means for carrying the material operated on, a presser located above said means and consisting in a belt, one run of which bears on said means, a roller engaging said run of the presser, a yoke spanning the presser and connected to the trunnions of the roller, and means for moving the roller so as to force the presser into engagement with the means for supporting the material operated on, substantially as described.

3. A press having a frame, a carrier, a hopper located at one end of the frame and above the carrier, a cutter within the hopper, a spreader located at the mouth of the hopper, two arms respectively connected to the side portions of the spreader and to the frame, and a screw connected with the spreader and with the frame whereby the spreader may be adjusted vertically, substantially as described.

GERHARD BAUMANN.

Witnesses:
NELSON DE WITT STRYKER,
WILLIAM L. ROWLAND.